Feb. 4, 1936. D. W. KLAU 2,029,427

SPOOL AND WINDER THEREFOR

Filed Jan. 12, 1934

INVENTOR
David W. Klau
BY
ATTORNEY

Patented Feb. 4, 1936

2,029,427

UNITED STATES PATENT OFFICE 2,029,427

SPOOL AND WINDER THEREFOR

David W. Klau, New York, N. Y.

Application January 12, 1934, Serial No. 706,378

3 Claims. (Cl. 242—61)

This invention relates generally to store-service appliances, but more specifically to a device for use in dry goods and like stores where laces, edgings, ribbons and other ribbon-like materials are dispensed, and an object of the invention is to provide a spool and a winder so co-related in structure that while each may be used without the other yet they are particularly adaptable for co-operative use at such times as for instance when a customer desires a measured length of ribbon from a given spool, the present device facilitating the easy unwinding of the ribbon from the spool and the easy re-winding of the ribbon free of the spool for delivery to the customer.

A further object is to so design the spool and the winder that there will exist a certain key relationship between the spool and the winder such that a given winder may be successfully used only with spools having the required key characteristics.

A further object is to provide a winder of sturdy and practical form and upon which the ribbon may be easily and quickly wound, and from which the wound ribbon may be easily and quickly removed, and which includes a conveniently placed handle by which to rotate it.

A further object is to provide a spool of convenient and practical form and which has openings therethrough selectively usable either as mounting means for the spool in storage or on display or to receive and co-operate with parts of the winder.

A further object is to provide the spool with key means by which it is adapted for use with a given winder.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification and in which I have shown merely a preferred form of embodiment of the invention:—

Figure 1:
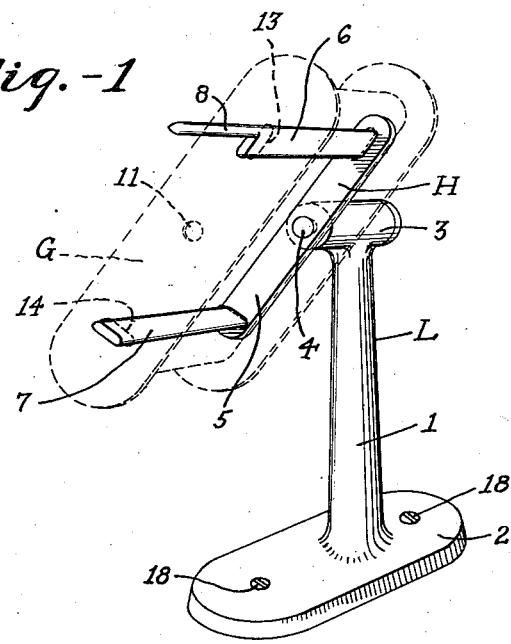
Fig. 1 is a perspective view of a winder having, in dotted lines in operative position thereon, a spool, all in accordance with the provisions of this invention.
Figure 2:
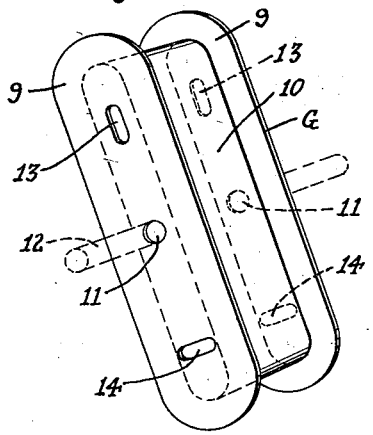
Fig. 2 is a perspective view of a spool constructed in accordance with this invention.

Referring to the drawing for describing the exemplary structure which is illustrated therein, and referring first to the structure illustrated in Figs. 1 and 2, the reference character L indicates generally the winder while the reference character G indicates generally the spool.

The winder consists of a standard 1 rising from a base 2 and formed at its upper end with a horizontal bearing 3 within which is rotatably mounted the rotor H.

The rotor H consists of a shaft 4 rotatable in the bearing 3. A bar 5 is fixed by its middle to one end of the shaft 4, and at the opposite ends of this bar are fixed a pair of arms as 6 and 7 parallel with each other and with the axis of shaft 4, said arms serving as the immediate mounting means for the spool G.

The two arms 6 and 7, considered together with the bar 5, make up a U-shaped member, the arms constituting the legs of the U and said arms having no connecting means between their outer ends.

One of the arms, as the arm 6, is formed with an extension part 8 thereon beyond the plane of the outer end of the other arm, said extension being shaped and serving as a handle by which an operator may rotate the rotor.

This handle is equally usable by the operator for turning the rotor whether a spool is positioned upon the arms or a ribbon is being wound upon said arms directly, and it will be noted that the handle thus positioned is at a natural and convenient point to be gripped by the operator by the same hand which may have just placed a spool upon the arms or which may have just adjusted a length of ribbon upon said arms for winding.

The spool G, in the form as illustrated, consists of spaced wall members as 9—9, usually of cardboard, and a connecting body portion 10 extending between the walls 9—9 and serving to space said walls and to connect them together all as one entity, the portion 10 being hollow or at least being formed with openings therethrough corresponding with the openings provided in the wall members 9—9 as will now be referred to.

Each wall member 9 is formed with a central opening as 11. This is adapted for use in receiving a rod as 12 upon which the spool may be either stored, mounted for display in a rack, or mounted for rotation in winding ribbon onto the spool or off of the spool.

Each wall member 9 is formed with other openings as 13 and 14 adapted to receive the arms 6 and 7 of the winder. These are placed at opposite sides of the central opening to match the positions of the arms 6 and 7 in such wise that when the spool is mounted upon said arms and rotated about the axis in shaft 4 the axis of rotation of the spool will occur concentrically of said spool or sufficiently nearly so as to facilitate the smooth and easy winding of ribbon onto or off of the spool, without need for a central arm on the rotor to engage within the openings 11 of the spool.

Figure 3:
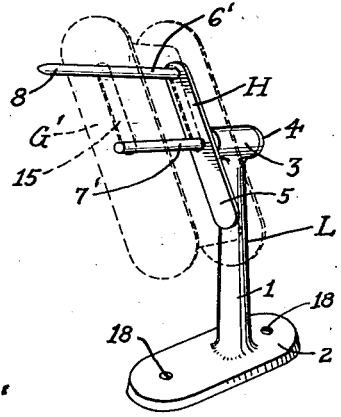
Fig. 3 is a view similar to Fig. 1 but illustrating a modification of the key relationship between the spool and the winder.
Figure 4:
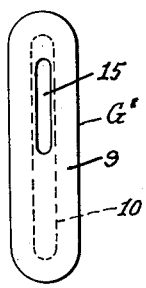
Fig. 4 is an edge view of the spool shown in Fig. 3.

In order to prevent use upon a given winder of spools other than those which are particularly desired for such use, it is proposed that the arms 6 and 7, and the openings 13 and 14 which receive them, shall have a predetermined key relationship. To this end the drawing herewith Figs. 1 and 2 show one form of key relationship, while Figs. 3 and 4 show a different form of key relationship, it being pointed out here that these forms are examples only of key relationships which may be employed.

In Figs. 1 and 2 the arms 6 and 7 are each of a cross sectional contour wider in one direction than in the other and they are set in angular relation to each other, the arm 6 being widest in the direction of length of the bar 5 and the arm 7 being widest transversely of said arm.

The spool, Fig. 2, has its openings 13 and 14 shaped and disposed to correspond with the shape and disposition of the arms 6 and 7, the openings 13 being longest in the direction of length of the spool and the openings 14 being longest transversely of the spool.

In order to mount the spool of Fig. 2 upon the arms 6 and 7 the openings 13 must be positioned to receive the arm 6 and the openings 14 to receive the arm 7. Should attempt be made to introduce arm 6 into openings 14 and arm 7 into openings 13 the attempt would not succeed. A proper mounting of the spool upon the arms 6 and 7 can only be obtained when the openings of the spool are of a contour and position to mate with the arms respectively.

In Figs. 3 and 4 the arm 7' passing through the spool G' is placed at or near to the center of rotation of the rotor, or at least at a different distance from said center as compared with the position of the arm 6'. The arms in this instance may be of irregular cross sectional contour, as in Fig. 1, or they may be simply round rods as indicated.

Figure 5:
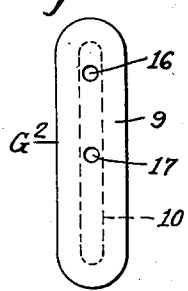
Fig. 5 is a view similar to Fig. 4 but showing a modified form of the key means therein.

The spools in this case may have a single opening as 15 in each of its walls 9—9, as shown in Figs. 3 and 4 or it may have two separate openings as 16 and 17 through said walls 9—9 as illustrated in Fig. 5. In either case the openings 15 or 16 and 17 will be positioned in a non-symmetrical relationship in the walls 9 to correspond with the non-symmetrical positions of the arms 6' and 7', the relation being such that when the spool is mounted upon the arms it will rotate substantially concentrically with the shaft 4 notwithstanding the non-concentric disposition of the arms 6' and 7' with respect to said shaft.

In the arrangement illustrated in Fig. 5 if the arm 7 be co-axial with shaft 4, and the openings 17 of the spool G² be accordingly at the center of the spool, said opening 17 may be employed whenever desired for the same purposes as above mentioned with respect to the openings 11.

In utilizing this device a store keeper may attach the winder at a convenient location upon his counter, utilizing for instance screws or other fastening devices as 18 to fix it to the counter.

A supply of spools G may be carried on his shelves, each with a different ribbon-like material wound thereon so as to be displayed and so as to be conveniently selected by a customer. The spools may be carried on rods as 12 at this time or otherwise as desired.

When a customer has selected a given spool the store keeper lifts that spool from his shelf, or slides it off the rod 12, and places it in its key relationship onto the arms of the winder. By then gripping the end of the ribbon he may draw out the ribbon measuring off a length to suit the purchaser, the rotor spinning around freely as the ribbon is thus drawn off.

After the desired length of ribbon has been drawn out and cut off then the spool is lifted off of the arms so that the arms are left free and ready for use as a foundation for and means of winding the cut off length of ribbon into a convenient hank for delivery to the customer.

If any portion of the length of the ribbon is to be rewound onto the spool before removal of the spool this is conveniently done by simply utilizing the handle 8 to rotate the spool to the desired extent in the wind-up direction.

To wind the cut off length of ribbon onto the bare arms, after removal of the spool, the operator adjusts a turn or two of the ribbon about the arms and then utilizes the handle 8 to rotate the rotor in a wind-up direction until the full cut-off length has been wound about the arms. He then simply slides the wound up ribbon lengthwise off the arms and it is ready for wrapping and delivery.

The device is simple and practical. It may be produced at small cost and is of a small and unobtrusive character so that it will occupy a negligent amount of space upon a store counter, and it may be used indefinitely as it includes no parts likely to get out of order.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A ribbon winder comprising a part providing a bearing and having means by which it may be mounted upon a suitable support, a rotor rotatably mounted in said bearing including a pair of arms about which the ribbon may be wound said arms being spaced apart and being disconnected at their outer ends so that the ribbon may be slid freely endwise off said arms, and one of said arms having an extending portion constituting a handle by which to rotate the rotor.

2. A ribbon winder comprising a part providing a bearing and having means by which it may be mounted upon a suitable support, a rotor rotatably mounted in said bearing including a pair of arms about which the ribbon may be wound said arms being spaced apart and being disconnected at their outer ends so that the ribbon may be slid freely endwise off said arms, and one of said arms having a part extending in the direction of length of the arm and along and off of which the ribbon may be freely slid from said arm said extending part constituting a handle by which to rotate the rotor.

3. A ribbon winder comprising a part providing a bearing and having means by which it may be mounted upon a suitable support, a rotor rotatably mounted in said bearing having means thereon to receive a spool in supported relation and to provide a handle by which to rotate the rotor and spool, and said means having key relationship to each other.

DAVID W. KLAU.